May 3, 1927.

H. R. LARSEN 1,627,187

COOKING UTENSIL

Filed April 14, 1925

Inventor
Hjalmar R. Larsen.
By his Attorney Fredk C Fischer

Patented May 3, 1927.

1,627,187

UNITED STATES PATENT OFFICE.

HJALMAR R. LARSEN, OF NEWARK, NEW JERSEY.

COOKING UTENSIL.

Application filed April 14, 1925. Serial No. 22,942.

My invention relates to cooking utensils, and comprises a plate adapted to rest on the bottom of a vessel, the top of said plate being provided with radial curved upwardly projecting grooves, the ends of said grooves forming openings between said plate and the bottom of the vessel, and has for its object to prevent food being cooked from burning or adhering to the bottom of the vessel or from boiling over the same.

Figure 1:
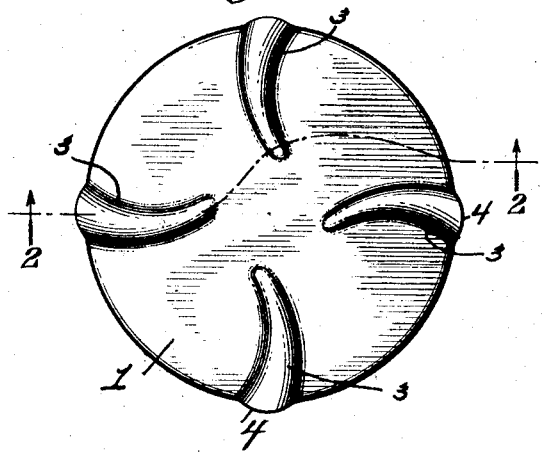
Figure 2:
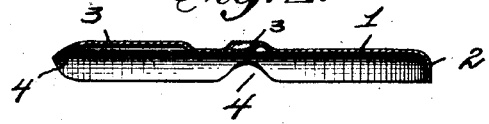
Figure 3:
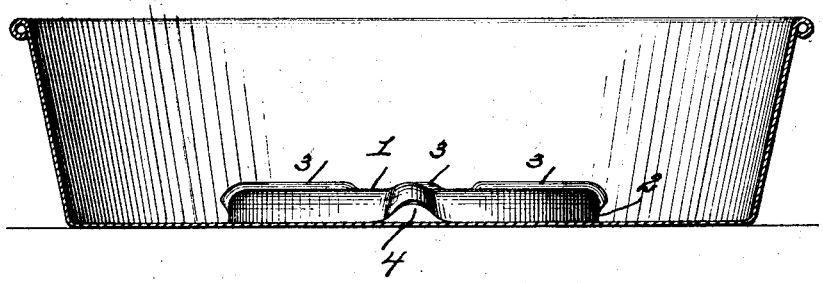

In the drawings, Figure 1 is a top plan view,

Figure 2 is a transverse section taken on lines x—x, looking in the direction indicated by the arrows, and Figure 3 is a transverse section of an ordinary vessel, showing my device in proper position therein.

Referring to the drawings, 1 represents a plate, preferably circular in form, and provided with a peripheral flange 2 which rests when in use, on the bottom of the vessel, as shown in Figure 3. This plate is preferably made of thin sheet metal, the shape of which lends itself readily to manufacture by the use of suitable punches and dies. The plate is further provided with a plurality of radial curved upwardly projecting grooves 3, the ends of said grooves forming openings 4 in the perpipheral flange 2, so that when the plate is in position in the vessel openings are formed between said plate and the bottom of the vessel to permit the liquid which is being boiled to circulate through said openings, by means of said grooves.

It will be seen that the grooves 3 are tapered and are narrower at the center of the plate than at the flange 2 where they form the openings 4.

In operation, the vessel being supplied with water and the substance to be cooked distributed therein, heat is applied causing the water to boil, whereupon that portion of the water under the plate, seeking an escape, is compelled, in constantly increasing amount, to flow outwardly below the grooves 3 which causes the water to form several currents, all disposed in a curved path, which entering the surrounding body of water sets up a circulatory or whirling movement found experimentally to assist very materially in disseminating the heat more uniformly and prevent the water in the vessel from boiling over.

Although I have shown the preferred form of my invention, I do not wish to be limited to the exact details of construction shown and described, as obvious modifications thereof may be made by those skilled in the art, and such modifications thereof, not requiring the exercise of the inventive faculties, I consider within the scope and terms of my claims.

Having thus described my invention, what I claim as new and desire to secure by Letters Patent, is:

1. A device of the character described comprising a flat imperforate plate provided with a peripheral flange adapted to rest on the bottom of a vessel, said plate being formed with a plurality of radial curved upwardly projecting grooves, the ends of said grooves forming openings in said peripheral flange.

2. A device of the character described comprising an imperforate plate substantially flat and provided with a peripheral flange adapted to rest on the bottom of a vessel, said plate being formed with a plurality of radial curved upwardly projecting grooves, the ends of said grooves forming openings in said peripheral flange, and being wider at the periphery of the plate than at its center.

This specification signed and witnessed this 13th day of April, 1925.

HJALMAR R. LARSEN.